Sept. 14, 1965  HANS-WALDEMAR STUHR  3,205,876
INTERNAL COMBUSTION ENGINE

Filed Nov. 13, 1962  4 Sheets-Sheet 4

INVENTOR
HANS—WALDEMAR STUHR
BY Toulmin & Toulmin
ATTORNEYS

United States Patent Office 3,205,876
Patented Sept. 14, 1965

3,205,876
INTERNAL COMBUSTION ENGINE
Hans-Waldemar Stuhr, Aschaffenburg am Main, Germany, assignor to Gesellschaft für Linde's Eismaschinen Aktiengesellschaft, Hollriegelskreuth, near Munich, Germany
Filed Nov. 13, 1962, Ser. No. 236,950
Claims priority, application Germany, Nov. 16, 1961, G 33,609; May 23, 1962, G 35,044
14 Claims. (Cl. 123—32)

The present invention relates to a reciprocating piston internal combustion engine of the self-igniting or diesel type, but without an injection pump or nozzle, more particularly, to a simplified arrangement of passages in such an engine for supplying fuel thereto.

In this type of internal combustion engine there is provided an auxiliary combustion chamber which communicates with the main combustion chamber through an overpass channel. A fuel supply chamber is formed in the cylinder head and receives fuel from an outside source. The fuel supply chamber communicates with two canals which either channel fuel into the overpass channel, or one canal delivers fuel into the overpass or auxiliary combustion chamber while the other canal delivers into the main combustion chamber, preferably at a point where there is relatively little movement of air. In such internal combustion engines it is generally the case that the fuel and air are proportioned and delivered in such a manner that upon entering the auxiliary combustion chamber the fuel-air mixture will be directed into a circular path with sufficient velocity to cause the drops of fuel to impinge against and be spread out over the inner wall of the auxiliary combustion chamber. This function is dependent not only on the radius of curvature of the inner wall of the auxiliary combustion chamber, but also on the cross-sectional dimensions of the overpass channel and its tangential relationship to the auxiliary combustion chamber. It is preferable that the overpass channel have at least one wall that is continuous with the inner wall of the auxiliary combustion chamber.

To accomplish this function as outlined above, such internal combustion engines usually have a large number of interconnecting bore holes in their cylinder heads, to provide the necessary passages. In the manufacture of such cylinder heads many boring operations are, therefore, necessary and these operations must generally be performed successively, which accordingly increases the time required in manufacturing the cylinder heads. Furthermore, these bore holes are usually arranged in such a complex system that cleaning and repairing operations are usually difficult to carry out. In addition, trouble has also been caused in the operation of the engine by the presence of burrs at the intersections of the various bore holes.

It is, therefore, the principal object of the present invention to provide a novel and improved bore hole system for the cylinder head of a new type of internal combustion engine of the reciprocating piston type with self-ignition, but without any injection pump or nozzle.

It is a further object of the present invention to provide a bore hole system wherein the number of boring operations is reduced to a minimum.

The bore hole system of the present invention essentially comprises positioning the fuel supply chamber and two of its communicating passages or bore holes in coaxial relationship so that these three elements can be produced by a single boring operation. Only one additional straight bore is then required for delivering the fuel to the fuel supply chamber, preferably tangentially to the chamber or to establish communication with the main combustion chamber.

It has been found to be preferable to have the fuel bore hole which opens into the overpass channel to be so positioned with respect to the channel that it forms an acute angle therewith, and is directed toward and into the auxiliary combustion chamber. This relationship not only facilitates the introduction of fuel into the auxiliary combustion chamber during the compression stroke of the engine, but also results in the fuel supply chamber becoming filled with the gases of combustion during the next power cycle. The residual fuel in this fuel supply chamber is expelled into the main combustion chamber and accordingly is not drawn into the overpass channel. On the contrary, some of the remaining gaseous products of combustion will be drawn from the auxiliary combustion chamber towards the fuel supply chamber during the next suction stroke. Such a periodic flushing or scavenging of the fuel from the fuel supply chamber is considerably facilitated by the coaxial relationship of the two bore holes extending from the fuel supply chamber.

The present invention also provides for the mounting of a bushing in one of the coaxial bore holes connecting to the fuel supply chamber. By using such a bushing the last-mentioned bore hole can have the same diameter as the fuel supply chamber so that both can be formed in a single boring operation. However, the central passage in the bushing can have its own diameter independently of the diameter of the bore hole.

There are several advantages deriving from the use of bushings or sleeves in the various bore holes of the cylinder head. These advantages are particularly evident if the cylinder head is made of a light alloy that does not have good heat resistent properties. Accordingly, bore holes in such an alloy may become rapidly corroded by the hot gases of combustion so as to lose their original dimensions. By providing heat resisting steel or ceramic liners within these bore holes the life of the engine can be greatly extended.

Another advantage is that such bushings can be given specific shapes which would be difficult to produce in a bore hole by a boring operation. For example, one of the modifications disclosed herein has helical grooves in the bore of the bushing so that fuel is delivered in spray form.

Several modifications of the present invention show different arrangements of bore holes and somewhat modified mountings of bushings in the bore hole systems all formed in accordance with the teachings of the present invention.

Other objects and advantages of the present invention will be readily apparent upon reference to the accompanying description when taken in conjunction with the following drawings wherein.

Returning now to the drawings wherein like reference symbols indicate the same parts throughout the various views, a specific embodiment and several modifications of the present invention will be described in detail.

Figure 1:
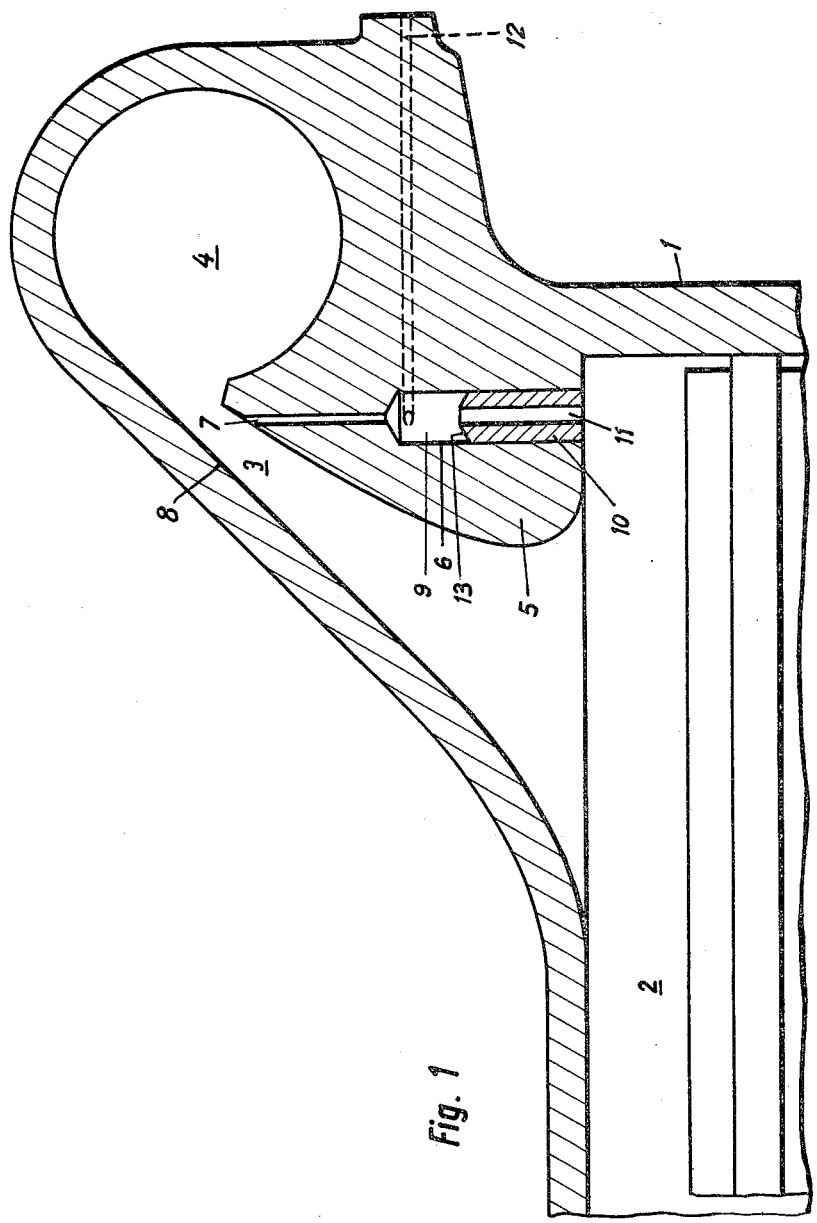
FIGURE 1 is a sectional view of a portion of an engine wherein a single bore hole has a fuel supply chamber therein, which bore hole is also provided with a bushing to function as a scavenging canal.

With particular reference to FIGURE 1, there is shown an upper portion of an engine block 1 and the upper portion of a cylinder formed in the engine block which defines a main combustion chamber 2. The main combustion chamber 2 communicates through an overpass channel 3 with an auxiliary combustion chamber 4 which is formed as a cylinder head 5 on top of the engine block 1.

Extending upwardly from the main combustion chamber 2 and in the direction of the overpass channel 3 is a bore hole 6. The upper end of the bore hole 6 has a small diameter portion 7 and communicates with a restricted portion 8 of the overpass channel 3. The bore hole portion 7 defines a fuel delivery canal which enters the overpass channel 3 at an acute angle and generally in the direction of the auxiliary combustion chamber.

The inner end of the larger diameter bore hole portion 6 defines a fuel supply chamber 9. The fuel supply chamber 9 is further defined by a hollow or tubular bushing 10 which is mounted in the bore 6 with a force fit and is provided with longitudinal bore 11 which functions as a scavenging canal.

A fuel supply canal or passage 12 is also formed in the cylinder head 5 and intersects the fuel supply chamber 9 at an angle so as to discharge fuel tangentially into the fuel supply chamber.

The inner end 13 of the bushing 10 is tapered so that the fuel which enters the fuel supply chamber 9 from the outlet of the fuel supply canal 12 will flow circumferentially with respect to the cylindrical wall of the supply chamber upon encountering the inner end 13 of the bushing 10.

During the operation of the invention as illustrated in FIGURE 1, there will be a reduction of pressure in the main combustion chamber 2 during the suction stroke. This reduced pressure will then be transmitted through the overpass channel 3 to the auxiliary combustion chamber 4 from which some of the residual gas will pass from the auxiliary combustion chamber to the main combustion chamber and also into the fuel delivery canal 7. This reduction of pressure will be transmitted especially through the scavenging canal 11 to chamber 9 with the result that a new supply of fuel will then be drawn into this chamber from the fuel supply canal 12.

Toward the end of the suction stroke the fuel supply chamber 9 will become filled with fuel.

During the compression stroke the air from the main combustion chamber 2 will be forced through the overpass channel 3 and across the open end of the fuel delivery canal 7 where it will have a relatively high velocity and hence a reduced pressure. The fuel which has accumulated in the fuel supply chamber 9 will therefore be driven into the delivery canal 7 and the overpass channel 3 by the increasing gas pressure in the scavenging canal 11.

In order to form the bore hole or canal system illustrated in FIGURE 1, only one hole needs to be bored into the cylinder head from the main combustion chamber. The enlarged portion of the bore hole, as indicated at 6, can be produced either by an enlarged portion of the same drill or by a separate drill and the fuel supply canal 12 is then drilled into the cylinder head from the exterior thereof. The bushing 10 is then forced into the bore hole 6. These four simple operations will eliminate the necessity for the complicated system of canals now used in fuel supply systems, and the fuel pump and fuel injection nozzle associated therewith.

In the structure of the present ivnention the movement of the air in the main combustion chamber 2 will be sufficient to force the fuel from the fuel supply chamber into the overpass channel. As a further modification, the bushing adjacent to the fuel supply chamber may be longitudinally adjusted in order to vary the effective volume of the fuel supply chamber. However, the bushing 10 which is positioned between the fuel supply chamber and the main combustion chamber may be spring mounted in the axial direction so as to be responsive to a reduction of pressure in the fuel supply chamber and thus force the fuel out of this chamber. As a further modification, this bushing can be axially movable in response to the rotation of the crankshaft in order to force fuel out of the fuel supply chamber into the auxiliary combustion chamber.

Figure 2:
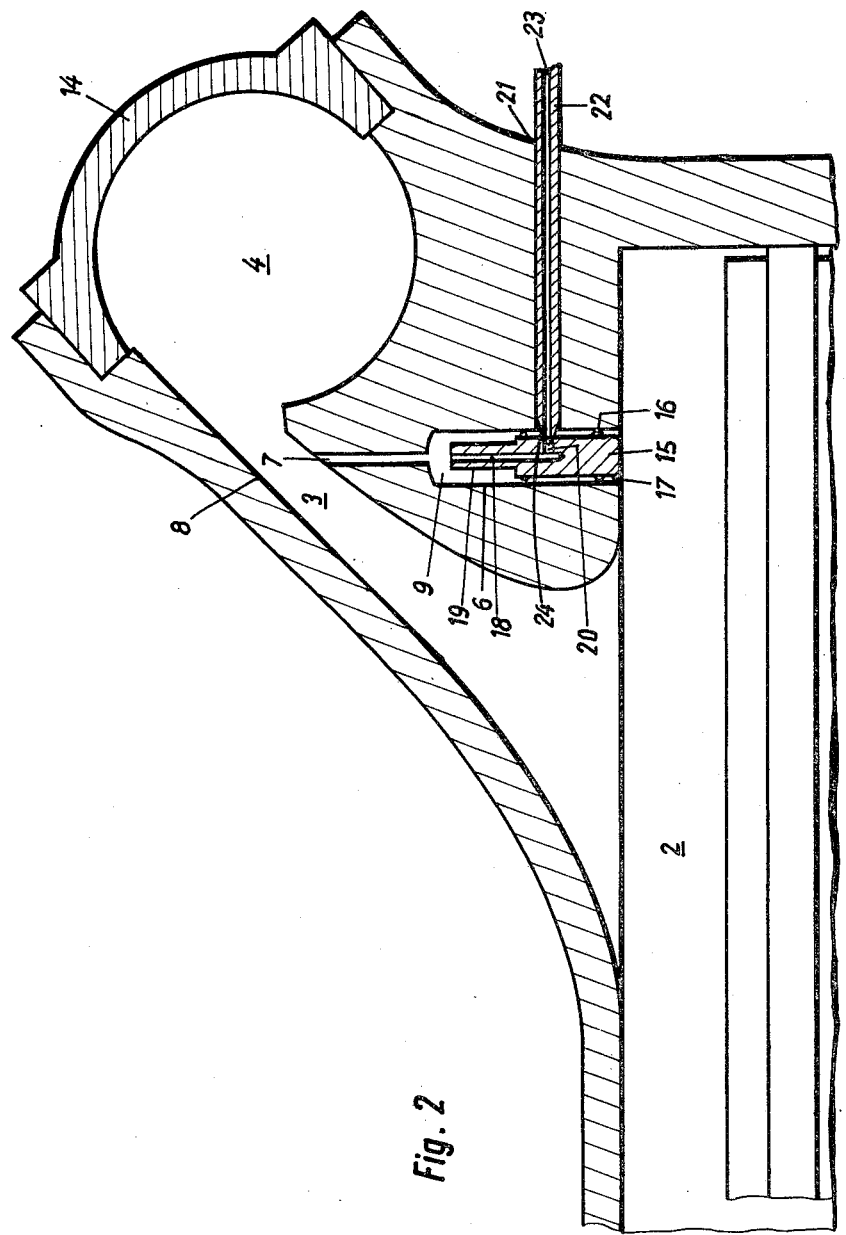
FIGURE 2 is a view similar to that of FIGURE 1, but shows a modification wherein the scavenging passage is formed around the bushing and fuel is introduced centrally through the bushing.

Proceeding now to FIGURE 2, this bushing can be made solid and without any axial passage therethrough. The outer periphery of the bushing, however, is slightly spaced from the wall of the bore hole so as to form a passage between the outer surface of the bushing and the cylindrical wall of the bore hole.

In FIGURE 2, the auxiliary combustion chamber 4 is provided with a removable cover plate 14 so as to be interchangeable with other cover plates in order to change the volume of the cylindrical auxiliary combustion chamber 4. The cover plate is fixed in position by any suitable fastening means such as cap screws.

The inner surfaces of the removable cover plate are so shaped and dimensioned that gases entering the auxiliary combustion chamber 4 will be able to circulate freely circumferentially within the chamber.

The bore hole 6 and the fuel delivery canal 7 are coaxial with the fuel supply chamber 9 being formed in the end of the larger diameter portion of the bore hole 6. A bushing 15 is inserted into the main combustion space end of the bore hole 6 which bushing is coaxial with the bore hole but is spaced from the walls thereof by spacers 16 so as to form a substantially cylindrical scavenging passage 17.

A coaxial bore 18 is formed through the upper portion of the bushing 15 and extends upwardly through a tube-like extension 19 on the inner end of the bushing 15 so as to project into the fuel supply chamber 9.

The bushing 15 is also provided with a lateral bore 20 which intersects the axial bore 18. A bore hole 21 is formed in the cylinder head from the exterior thereof toward the bore hole 6 and has a tubular bushing 22 mounted therein with the bore 23 of the bushing 22 forming a fuel supply canal. The inner end of the bushing 22 as indicated at 24, is tapered so as to be inserted into the lateral bore 20 to supply fuel thereto.

In this modification wherein the fuel is introduced into the fuel supply chamber through the central bore of the same bushing which forms the scavenging canal leading to the main combustion chamber, the extension of the central tubular portion of the bushing far to the interior of the fuel supply chamber eliminates any possibility of fuel passing into the canal leading to the main combustion chamber before the supply chamber is completely or substantially filled.

In the structure of FIGURE 2 the reduction of pressure in the main combustion chamber 2 during the suction stroke will be transmitted through the scavenging passage 17 to the fuel supply chamber 9 so that fuel will be drawn into the supply chamber from the central bore 18. During the compression stroke a portion of the gases in the main combustion chamber 2 will be forced through the scavenging passage 17 into the fuel supply chamber 9 from which the fuel will be forced into the fuel delivery canal 7 and from there into the overpass channel 3.

With respect to the fabrication of the cylinder head shown in FIGURE 2, after the necessary bore holes have been drilled therein, the bushing 15 is inserted into the bore hole 6 and then the bushing 22 forced into bore hole 21.

The advantage of the cylindrical passage 17 is that this passage can have a larger total area in cross section but will still offer considerable resistance to the flow of fluids therethrough because of the large exposed internal surface of the bore hole 6 and external surface of the bushing 15. This is an important consideration when the scavenging passage leads into the main combustion chamber.

The end of this scavenging passage adjacent to the fuel supply chamber can be provided with a throttling device which offers relatively little resistance to the passage of gases therethrough but considerable resistance to the passage of liquid so as to prevent any appreciable flow of fuel into the main combustion chamber during periods of reduced pressure therein. This function can be obtained by the use of suitable materials and also by proper shaping of the restricted passage.

The throttle device can be formed of a ring 16 fitted snugly into the bore hole but having recesses in its inner periphery. The large cross sectional area of such a throttle pasage will permit a reduction of pressure to be quickly transmitted to the supply chamber during the suction stroke so that fuel will promptly fill the fuel supply chamber. However, this fuel will be prevented from flowing freely into the main combustion chamber, particularly during the suction stroke when the introduction of any appreciable amount of fuel into the combustion chamber would interfere with the impending combustion process. In the event some of the fuel does flow into the passage leading to the main combustion chamber, the large surface friction in this passage will provide sufficient resistance to the flow of fuel to completely prevent the fuel from reaching the main combustion chamber before the suction stroke is terminated. The presence of some fuel in the throttle space will also have the effect of delaying the passage of the fuel to the overpass channel during the compression stroke sufficiently so that the combustion process will not be initiated until the proper time.

Figure 3:
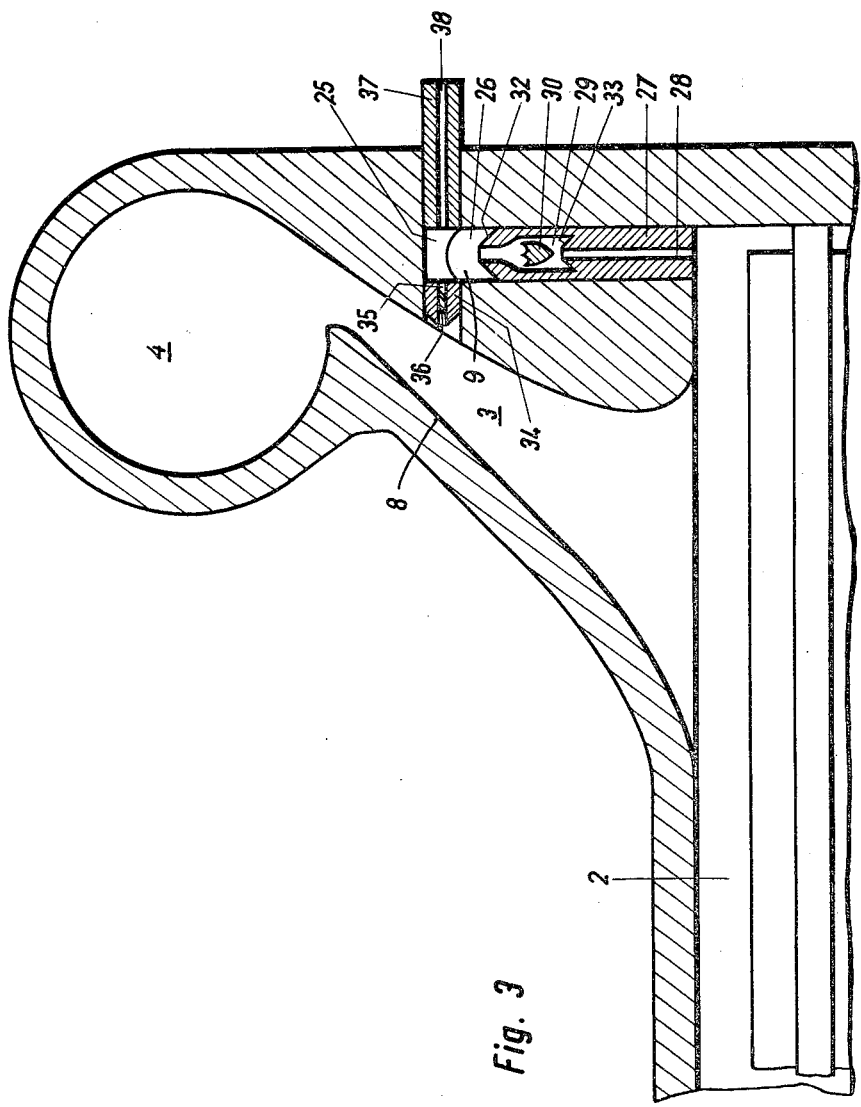
FIGURE 3 is a sectional view similar to that of FIGURES 1 and 2, but shows a further modification wherein the bushing has a modified structure to provide a scavenging canal.
Figure 4:
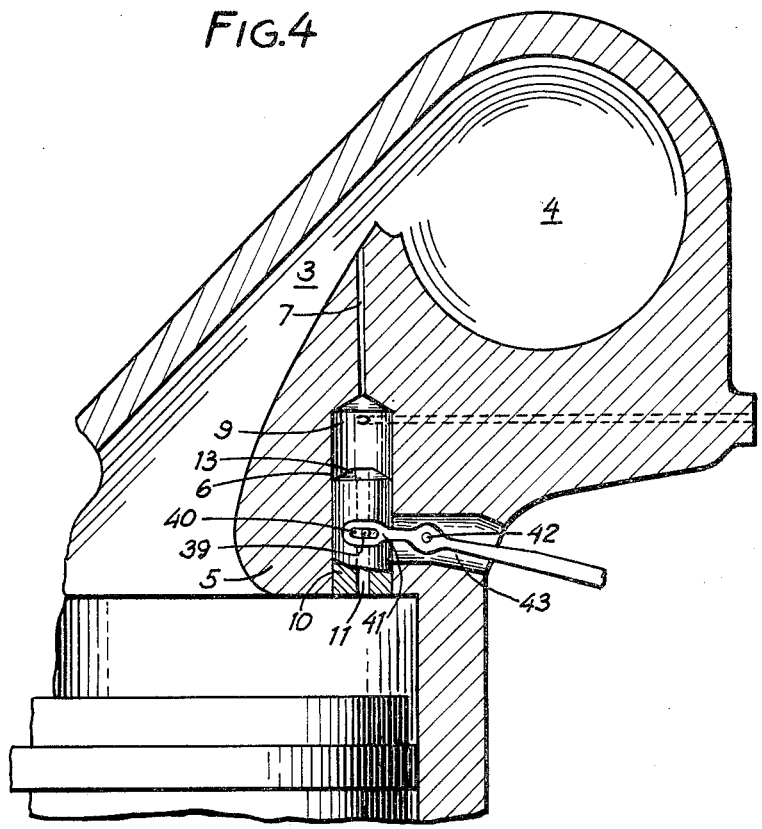
FIGURE 4 is a sectional view similar to that of FIGURES 1 and 2, but shows a further modifiaction wherein the bushing is longitudinally adjustable in order to vary the effective volume of the fuel supply chamber.

In the modification of FIGURE 3, the main combustion chamber 2 is similarly connected with the auxiliary combustion chamber 4 through the overpass channel 3. In the cylinder head a bore hole 25 is formed extending from the exterior of the cylinder head to the restricted portion 8 of the overpass channel 3. A second bore hole 26 is formed extending upwardly from the main combustion chamber 2 to intersect the bore hole 25. A bushing 27 having an axial bore 28 is then mounted in the bore hole 26. The bushing 27 has an enlarged space 29 therein communicating with the end of the axial bore 28. A solid body 30 is mounted within the space 29 and is smoothly tapered or streamlined with the point thereof directed toward the main combustion chamber. The upper end, indicated at 31, of the body 30, is recessed in such a manner as to divert to the largest possible angle any liquid that strikes this end of the body. Thus any fuel reaching this solid body from the fuel supply chamber 9 will be deflected in the reverse direction and thus be impeded in its passage in the direction to the main combustion chamber.

The inner end of the bushing 27, indicated at 32, is conical and substantially parallel to the conical end 33 of the enlarged space 29. The conical inner end 32 of the bushing thus defines an end wall of the fuel supply chamber 9 which is formed at the intersection of the bore holes 25 and 26.

A bushing 34 having a central axial bore 35 is mounted in the bore hole 25 between the overpass channel and the fuel supply chamber. Helical grooves 36 are provided within the central bore 35 so as to spray the fuel into the overpass channel 3.

A second tubular bushing 37 having a central axial bore 38 is inserted into the bore hole 25 and is connected to an external source of fuel for supplying fuel to the fuel supply chamber 9.

The bushing mounted in the bore hole leading to the overpass channel which in the modification of FIGURE 3 is the bushing 34, may extend a short distance into the overpass channel to enable the gases passing through the channel to keep the end of the bushing clean and unobstructed by materials such as soot or carbon deposits.

Figure 5:
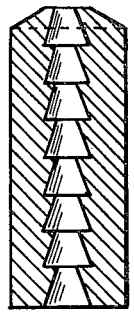
FIGURE 5 shows a modified form of bushing, wherein the bore hole has a series of funnel-shaped enlargements.

It is also possible to provide a wall of the bore hole which connects the fuel supply chamber with the main combustion chamber with a series of funnel-shaped enlargements shown in FIGURE 5, whose wide ends are directed toward the main combustion chamber while the narrow ends are directed toward the fuel supply chamber. This construction will permit free movement of fluid toward the fuel supply chamber but will offer maximum resistance to the flow of fluid in the opposite direction. While in the modification of FIGURES 1 and 3 the end of the bushing is conical, this end of the bushing may also be helical or spiral shaped so as to impart a whirling motion to any fluid entering the fuel supply chamber and thus keep it from entering the mouth of the scavenging canal. It is not necessary that this bushing be coterminous with the enlarged portion of the bore hole.

Thus it can be seen that the present invention provides a simple, yet effective, bore hole system in an internal combustion engine for feeding fuel to the engine without the use of a fuel pump or a nozzle.

It will be understood that this invention is susceptible to modification in order to adapt it to different usages and conditions, and accordingly, it is desired to comprehend such modifications within this invention as may fall within the scope of the appended claims.

What is claimed is:

1. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole in said cylinder head with one end of said bore hole having a large diameter portion opening into said main combustion chamber and the other end having a smaller diameter portion opening into the restricted portion of said overpass channel, and a bushing mounted in the large diameter portion of said first bore hole and terminating short of the inner end of said large diameter portion so as to form a fuel supply chamber therein, there being a second bore hole in said cylinder head intersecting said first bore hole to supply fuel thereto, and the inner end of said bushing being tapered.

2. In an internal combustion engine of the reciprocating piston type as claimed in claim 1, wherein said bushing has a central bore therethrough defining a scavenging canal.

3. In an internal combustion engine of the reciprocating piston type as claimed in claim 1, wherein said second bore hole opens tangentially into said fuel supply chamber.

4. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole in said cylinder head with one end of said bore hole having a large diameter portion opening into said main combustion chamber and the other end having a smaller diameter portion opening into the restricted portion of said overpass channel, and a bushing mounted in the large diameter portion of said first bore hole and terminating short of the inner end of said large diameter portion so as to form a fuel supply chamber therein, there being a second bore hole in said cylinder head intersecting said first bore hole to supply fuel thereto, the longitudinal axis of said second bore hole being offset from the longitudinal axis of said first bore hole.

5. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole in said cylinder head with one end of said bore hole having a large diameter portion opening into said main combustion chamber and the other end having a smaller diameter portion opening into the restricted portion of said overpass channel, there being a second bore hole in said cylinder head intersecting said first bore hole to supply fuel thereto, a bushing mounted within the large diameter portion of said first bore hole and spaced from the cylindrical wall of said first bore hole so that the inner end of said bushing defines a fuel supply chamber and the remaining portion of the bushing defines with the cylindrical wall of the bore hole a scavenging passage opening into the main combustion chamber, said bushing having an axial central bore, and the innner end of the bushing being reduced in diameter and projecting into the supply chamber.

6. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole in said cylinder head with one end of said bore hole having a large diameter portion opening into said main combustion chamber and the other end having a smaller diameter portion opening into the restricted portion of said overpass channel, there being a second bore hole in said cylinder head intersecting said first bore hole to supply fuel thereto, a bushing mounted within the large diameter portion of said first bore hole and spaced from the cylindrical wall of said first bore hole so that the inner end of said bushing defines a fuel supply chamber and the remaining portion of the bushing defines with the cylindrical wall of the bore hole a scavenging passage opening into the main combustion chamber, there being a longitudinal bore within the inner end of said bushing and a lateral bore in said bushing communicating between said longitudinal bore and the outer surface of said bushing, and a second bushing within said second bore hole communicating with said lateral bore in said first bushing to supply fuel thereto.

7. In an internal combustion engine of the reciprocating piston type as claimed in claim 6, with the inner end of said first bushing having a smaller diameter than the remaining portion of said bushing so as to form a tubular extension.

8. In an internal combustion engine of the reciprocating piston type, the combination of an outside fuel source, a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, said cylinder head having a first bore hole communicating between said restricted portion of said overpass channel and the exterior of said cylinder head and leading from there to said outside fuel source, there being a second bore hole in said cylinder head communicating between said first bore hole and said main combustion chamber, and a bushing in said first bore hole between said overpass channel and said second bore hole to supply fuel to said restricted portion of said overpass channel.

9. In an internal combustion engine of the reciprocating piston type, the combination of an outside fuel source, a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, said cylinder head having a first bore hole communicating between said restricted portion of said overpass channel and the exterior of said cylinder head and leading from there to said outside fuel source, there being a second bore hole in said cylinder head communicating between said first bore hole and said main combustion chamber, a first bushing in said first bore hole between said overpass channel and said second bore hole to supply fuel to said restricted portion of said overpass channel, and a second bushing in said first bore hole between said second bore hole and the exterior of said cylinder head for supplying fuel.

10. In an internal combustion engine of the reciprocating piston type, the combination of an outside fuel source, a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, said cylinder head having a first bore hole communicating between said restricted portion of said overpass channel and the exterior of said cylinder head and leading from there to said outside fuel source, there being a second bore hole in said cylinder head communicating between said first bore hole and said main combustion chamber, a first bushing in said first bore hole between said overpass channel and said second bore hole to supply fuel to said restricted portion of said overpass channel, a second bushing in said first bore hole between said second bore hole and the exterior of said cylinder head for supplying fuel, and a third bushing in the end of said second bore hole opening into said combustion chamber to define a scavenging canal.

11. In an internal combustion engine of the reciprocating piston type as claimed in claim 10, with said first bushing having helical grooving within the central bore thereof.

12. In an internal combustion engine of the reciprocating piston type, the combination of an outside fuel source, a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, said cylinder head having a first bore hole for supplying fuel to said restricted portion of said overpass channel and communicating between said restricted portion of said overpass channel and the exterior of said cylinder head and leading from there to said outside fuel source, there being a second bore hole in said cylinder head communicating between said first bore hole and said main combustion chamber, said first bore hole between said overpass channel and said second bore hole having a smaller diameter than the diameter of said first bore hole between said second bore hole and the exterior of said cylinder head, a first bushing in said first bore hole between said second bore hole and the exterior of said cylinder head for supplying fuel, and a second bushing in the end of said second bore hole opening into said combustion chamber to define a scavenging canal.

13. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole through said cylinder head and a second bore hole therein intersecting said first bore hole to define a bore hole system forming a supply chamber at the point where said second bore hole intersects said first bore hole, said bore hole system having three openings, one of said openings communicating to the exterior of said cylinder head to receive fuel, the second opening communicating with the restricted portion of said overpass channel to deliver fuel thereto, the third opening communicating with the main combustion chamber, and a bushing within said third opening to define a restricted passage for scavenging certain of said holes, there being an enlarged portion within said bushing, and a tapered body mounted within said enlarged portion with the pointed end directed toward said main combustion chamber and having recesses in the other end directed toward said first bore hole to offer maximum resistance to fluid flowing in a direction from said supply chamber to said main combustion chamber.

14. In an internal combustion engine of the reciprocating piston type, the combination of a block having a cylinder therein defining a main combustion chamber, a cylinder head mounted on said block and having an auxiliary combustion chamber therein, said cylinder head having an overpass channel with a restricted portion therein connecting said auxiliary combustion chamber and said main combustion chamber, there being a first bore hole through said cylinder head and a second bore hole therein intersecting said first bore hole to define a bore hole system having three openings, one of said openings communicating to the exterior of said cylinder head to receive fuel, the second opening communicating with the restricted portion of said overpass channel to deliver fuel thereto, the third opening communicating with the main combustion chamber, and a bushing in the bore which leads to said third opening, said bushing stopping short of the inner end of the bore to provide a space, said bushing forming a restricted passageway for scavenging said last-mentioned bore and said space in the bore in front of the bushing and the bore which leads to the second opening, in response to the drop of pressure between the third opening and the second opening which results from the forcing of the gas from the main combustion chamber through the overpass channel into the auxiliary combustion chamber, said bushing having an axial central bore, and the inner end of the bushing being reduced in diameter and projecting into the supply chamber.

References Cited by the Examiner
FOREIGN PATENTS
783,251  4/35  France.

RICHARD B. WILKINSON, *Primary Examiner*.